Figure 1:
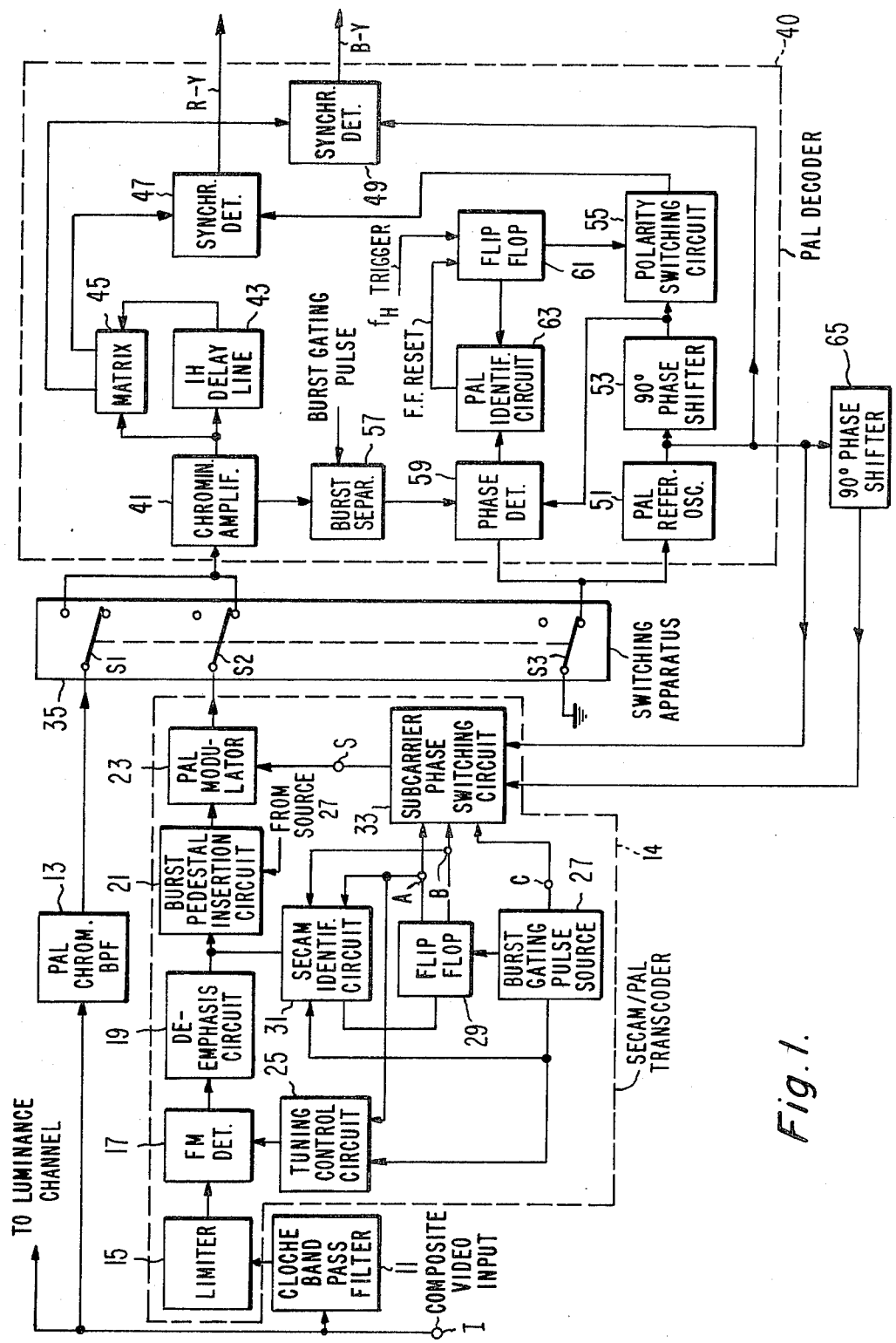

United States Patent [19]

Groeneweg

[11] 4,233,622
[45] Nov. 11, 1980

[54] SECAM-PAL CONVERTER

[75] Inventor: Willem H. Groeneweg, Ottenbach, Switzerland

[73] Assignee: RCA Corporation, New York, N.Y.

[21] Appl. No.: 1,166

[22] Filed: Jan. 5, 1979

[30] Foreign Application Priority Data

Jan. 9, 1978 [GB] United Kingdom .................... 658/78

[51] Int. Cl.³ .............................................. H04N 9/42
[52] U.S. Cl. ....................................................... 358/11
[58] Field of Search ........................................... 358/11

[56] References Cited

U.S. PATENT DOCUMENTS 4,095,254  6/1978  Romeas ................................. 358/11

FOREIGN PATENT DOCUMENTS 1358551  7/1974  United Kingdom .

*Primary Examiner*—Richard Murray
*Attorney, Agent, or Firm*—E. M. Whitacre; W. H. Meagher

[57] ABSTRACT

A SECAM-encoded chrominance signal is converted to a chrominance signal of a quasi-PAL form for further processing in PAL decoder apparatus. Converter includes an FM detector serving to demodulate respective SECAM subcarriers sequentially, and a modulator wherein the color-difference signals recovered by the FM detector amplitude modulate in appropriate sequence quadrature-related phases of PAL subcarrier frequency oscillations derived from the PAL decoder. The color-difference signals supplied to the modulator are augmented by line rate pedestals effecting the insertion of bursts in the quasi-PAL signal developed by the modulator. The phasing of the inserted bursts alternates between a first phase corresponding to the oscillation phase subject to modulation by R-Y color-difference signals, and a second phase differing from the first phase by 180°. Insertion of bursts of the first phase immediately precedes the development of R-Y modulated subcarrier waves by the modulator, while insertion of bursts of the second phase immediately precedes the development of B-Y modulated subcarrier waves by the modulator.

6 Claims, 4 Drawing Figures

SECAM-PAL CONVERTER

The present invention relates generally to novel apparatus for converting chrominance information encoded in SECAM fashion to a chrominance signal suitable for application to a PAL decoder, and to color television receiver arrangements for advantageously using such conversion apparatus.

In the SECAM color television system, R-Y and B-Y color-difference signals frequency modulate respective subcarriers (4.40625 MHz and 4.250 MHz) which are provided alternately on a line-by-line basis in the transmitted signal. An economical approach to processing such signals in a SECAM receiver, which is also attractive for use in dual standard (SECAM/PAL) receivers is to convert the SECAM signal into a "quasi-PAL" signal of a form suitable for further processing by standard PAL signal decoding techniques. The system for effecting such conversion is desirably of the general type described in U.K. Pat. No. 1,358,551, wherein the respective SECAM subcarriers are demodulated sequentially by a frequency discriminator, and the resultant color-difference signals amplitude modulate in appropriate sequence respective phases of a subcarrier derived from the PAL reference oscillator of the PAL decoder apparatus.

Pursuant to the principles of the present invention, the quasi-PAL signal developed by the converter includes constant-amplitude bursts of oscillations of PAL subcarrier frequency which precede each line interval image portion occupied by a modulated subcarrier component. The burst preceding the R-Y modulated subcarrier is of a first phase corresponding to the subcarrier phase subject to R-Y modulation, while the burst preceding the B-Y modulated subcarrier is of a second phase differing from the first phase by 180°. During use of the PAL decoder apparatus to process the quasi-PAL signal, the PAL reference oscillator is left in a free-running state by disrupting the normal coupling of a phase control signal thereto from the burst phase detector of the PAL decoder. However, the nature of the burst phase alternation allows the development of a half line rate component by the phase detector to permit appropriate operation of PAL line identification, ACC and color killer circuits of the PAL decoder apparatus.

The burst phasing system of the present invention differs from that associated with the "swinging burst" of the standard PAL system, where the phase of the burst alternates on a line-by-line basis between a phase leading the $-(B-Y)$ phase by 45° and a phase lagging the $-(B-Y)$ phase by 45°. It will be appreciated, however, that the swinging burst of the standard PAL system corresponds to the sum of a fixed $-(B-Y)$ phase component with a $+(R-Y)$ phase component subject to phase reversal on alternate lines, with the latter component's phase reversals providing identification information for line-by-line switching control at the decoder and with the former component establishing the average burst phase for oscillation phase synchronization purposes at the decoder. When employing the conversion system of the aforesaid U.K. patent, however, phase synchronization of the PAL reference oscillator is not required. Accordingly, a phase reversing $(R-Y)$ component alone is utilized for the burst of the quasi-PAL signal of the present invention, permitting use of relatively simple switching circuitry for burst development and yet providing adequate information for proper operation of the PAL decoder apparatus in its processing of the quasi-PAL signal.

Figure 4:
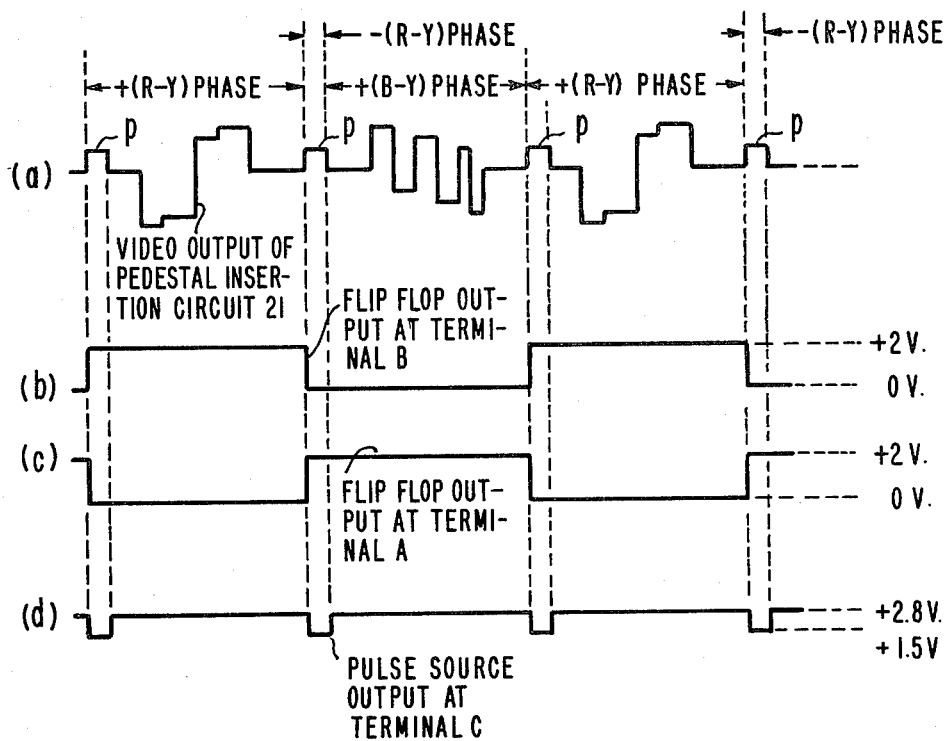
Figure 2:
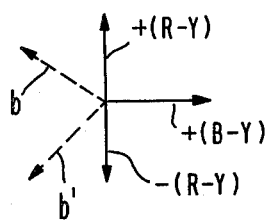
Figure 3:
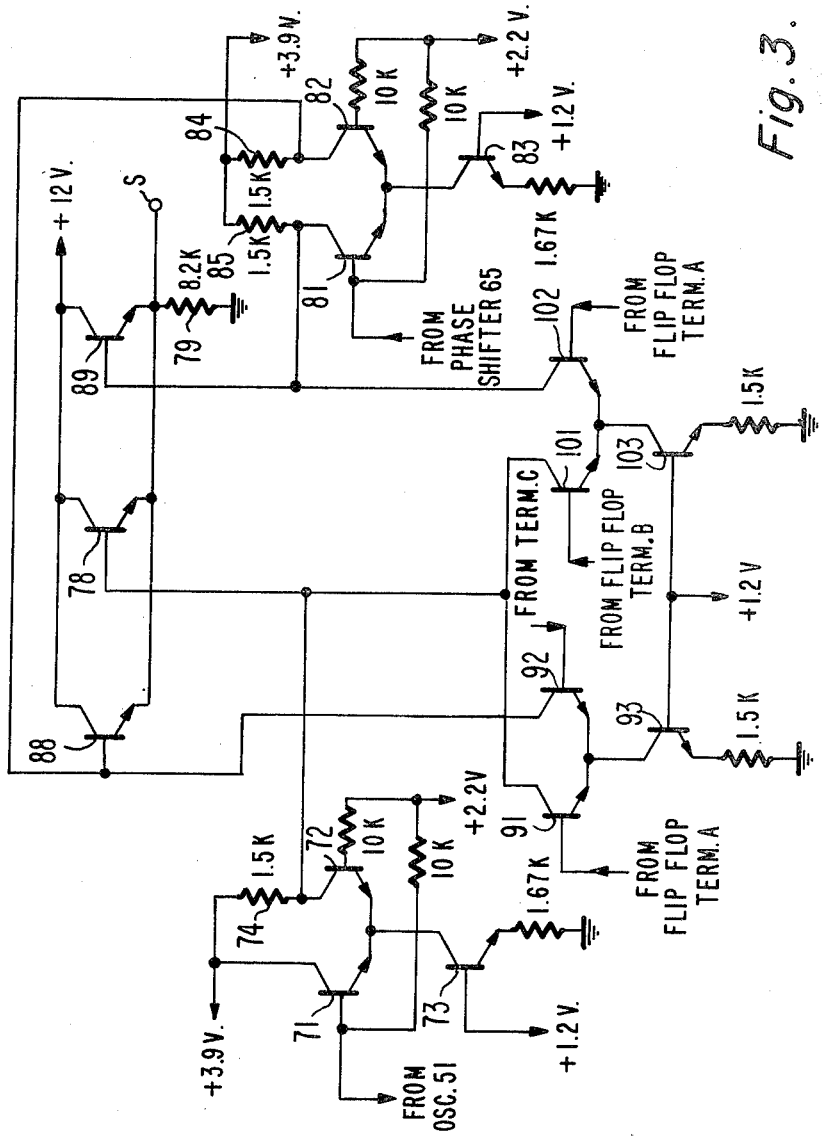

In the accompanying drawings:

FIG. 1 provides a block diagram illustration of a dual-standard SECAM/PAL color television receiver arrangement, incorporating apparatus for converting a SECAM-encoded chrominance signal to a quasi-PAL chrominance signal in accordance with an illustrative embodiment of the present invention;

FIG. 2 provides a vector diagram of subcarrier phases, of aid in explaining the operation of the apparatus of FIG. 1;

FIG. 3 illustrates schematically circuitry for performing subcarrier phase switching functions in an illustrative implementation of the arrangement of FIG. 1; and FIG. 4 illustrates graphically voltage waveforms of aid in explaining the operation of the circuitry of FIG. 3.

In the dual standard receiver arrangement of FIG. 1, a composite video input signal (derived from the receiver's video detector, not illustrated) appears at input terminal I, and is supplied to a pair of bandpass filters 11 and 13, as well as to the receiver's luminance channel (not illustrated). Bandpass filter 13 encompasses the chrominance signal bandwidth associated with a PAL transmission. Bandpass filter 11 encompasses the chrominance signal bandwidth of a SECAM transmission, and is provided with a bandpass characteristic of a "cloche" or bell-shaped form, appropriately complementary to the characteristic employed for high frequency pre-emphasis of subcarrier sidebands in SECAM signal formation.

The output of bandpass filter 11 is supplied to a SECAM/PAL transcoder 14 embodying the present invention. The transcoder 14 includes a limiter 15, which accepts the output of bandpass filter 11 and delivers a limited version thereof to an FM detector 17, illustratively of the quadrature detector type.

A tuning control circuit 25 is associated with the FM detector 17 so as to alter the effective center frequency of its frequency discriminator characteristic in a controlled manner to be described in detail subsequently. The tuning control is such that, during a SECAM signal reception, the output of the signal FM detector sequentially comprises, during the image portions of successive line intervals, $R-Y$ and $B-Y$ color-difference signals. This color-difference signal output of detector 17 is supplied to a de-emphasis circuit 19 with a characteristic complementary to the modulating signal pre-emphasis employed in SECAM signal formation. The output of the de-emphasis circuit 19 is supplied to a burst pedestal insertion circuit 21, which serve to augment the color-difference signal output of the detector with burst gating pedestals occupying an appropriate segment of the blanking portion of each line interval.

The augmented color-difference signal output of circuit 21 is supplied as a modulating signal to a PAL modulator 23, which modulates the amplitude of subcarrier waves of PAL subcarrier frequency in accordance with the modulated signal. The subcarrier wave input terminal S of modulator 23 receives subcarrier frequency waves in a particular phase sequence appropriate to the formation of a quasi-PAL signal by modulator 23, pursuant to previously outlined principles of the present invention.

The desired phase sequencing of the subcarrier wave input to modulator 23 is carried out by a subcarrier phase switching circuit 33, which receives PAL reference oscillations from a PAL decoder 40, to be subsequently described, and which receives line rate control waves from a burst gating pulse source 27 and half line rate control waves from a flip-flop circuit 29. The flip-flop circuit 29, which is subject to triggering by an output of the burst gating pulse source 27, is controlled in its phasing by a SECAM identification circuit 31. The identification circuit 31 determines the correctness or incorrectness of the phasing of the flip-flop circuit operation via appropriate monitoring of the de-emphasized output of the FM detector 17.

Illustratively, the SECAM identification circuit 31, and the associated tuning control circuit 25 are of the general form described in the co-pending U.K. Patent Application No. 2067/78, filed Jan. 18, 1978. In such an arrangement, control circuit 25 provides detector 17 with discriminator center frequency tuning appropriate to demodulation of the R−Y SECAM subcarrier (4.40625 MHz) during the image portion of an R−Y line interval of the SECAM signal, and tuning appropriate for demodulation of the B−Y modulated subcarrier (4.250 MHz) during the image portion of a B−Y line interval of the SECAM signal; however, the timing of the changes in discriminator center frequency tuning is such that during the lead-in bursts preceding the image portions of both of such R−Y and B−Y line intervals, the discriminator center frequency tuning is the same (e.g., tuned for a center frequency corresponding to the R−Y subcarrier). As a consequence of holding the same (R−Y subcarrier) center frequency tuning for all burst intervals, there appears in the output of detector 17 pulses during alternate line interval blanking portions which identify the occurrence of a B−Y line interval.

In the identification system of the aforementioned U.K. application, use is made of such pulse development to effect a control of the flip-flop phasing. Illustratively, a pair of sample-and-hold circuits are provided for response to the FM detector output. Using half line rate control waves from a flip-flop (such as circuit 31 of FIG. 1), and line rate pulses with timing of the type provided by burst gate pulse source 27, one sample-and-hold circuit effects sampling of the detector output during the lead-in burst occurrence of alternate line intervals, while the other sample-and-hold circuit effects a sampling of the detector output during the lead-in burst occurrence of the intervening line inervals. Comparison of the outputs of the two sample-and-hold circuits indicates the correctness or incorrectness of the control of the discriminator center frequency tuning, and thus indicates the correctness or incorrectness of the phasing of the flip-flop circuit operation. If the flip-flop phasing is incorrect, the flip-flop is shut down, and then allowed to restart, whereupon a new comparison is effected, with such a process repeated until correct flip-flop phasing is achieved.

Pursuant to the principles of the present invention, the operation of the subcarrier phase switching circuit 33 is carried out in such a way that the following results are obtained:

(A) During the image portion of a line interval when a B−Y color difference signal is supplied to the modulating signal input terminal of modulator 23, the PAL subcarrier waves delivered to the subcarrier wave input terminal S of modulator 23 is of a phase designated +(B−Y) in the vector diagram of FIG. 2;

(B) During the image portion of a line interval when R−Y color difference signals are supplied to the modulating signal input terminal of modulator 23, the subcarrier waves delivered to terminal S are of the phase designated +(R−Y) in the vector diagram of FIG. 2, a phase leading the +(B−Y) phase by 90°;

(C) During delivery of the burst gating pedestal immediately preceding R−Y color difference signal delivery to modulator 23, the subcarrier waves delivered to terminal S are of the aforementioned +(R−Y) phase;

(D) During delivery of the burst gate pedestal immediately preceding delivery of B−Y color difference signals to modulator 23, the subcarrier waves delivered to terminal S are of the phase designated −(R−Y) in the vector diagram of FIG. 2, a phase differing from the +(R−Y) phase by 180° and lagging the +(B−Y) phase by 90°.

In the vector diagram of FIG. 2, the dashed line vectors b and b' illustrate the phasing associated with the "swinging bursts" of a standard PAL transmission. It will be seen that the burst phases (+R−Y and −R−Y) of the quasi-PAL signal developed by modulator 23 differ from the phases of the standard PAL swinging bursts.

The output of modulator 23 is supplied to the input terminal of a switch section (S2) of switching apparatus 35, which also includes additional switching sections, S1 and S3, ganged with switch section S2. The switching apparatus 35 serves to alter the mode of receiver operation between a SECAM-encoded signal reception mode and a PAL-encoded signal reception mode. In the illustrated (SECAM reception) switching condition of switching apparatus 35, switch section S2 enables the coupling of the output of modulator 35 to the input of a chrominance amplifier 41, forming the input section of a PAL decoder 40.

The output of the previously mentioned PAL bandpass filter 13 is coupled to the input of switch section S1. In the illustrated (SECAM reception) switching condition of switching apparatus 35, switch section S1 disrupts the coupling of the output of filter 13 to the input of chrominance amplifier 41; however, when switching apparatus 35 is altered to the alternative (PAL reception) switching condition, this coupling is enabled, whereas the modulator output coupling is disabled.

The third switching section S3 serves to effect a disabling (e.g., by grounding) of the coupling of a phase control signal to the reference oscillator 51 of the decoder 40 when the receiver is operating in the SECAM reception mode, while enabling such coupling when the receiver is operating in the PAL reception mode.

The switching apparatus 35 may simply comprise ganged, manually actuated switches. Preferably, however, the switching functions are implemented by electronic switching devices controlled automatically in accordance with recognition of the PAL or SECAM nature of the received signals. With use of the identification techniques of the above-discussed U.K. application, such control may be provided by an output of the identification circuit 31, as explained in greater detail in said U.K. application.

With the switching apparatus 35 in the illustrated (SECAM reception) switching condition, the quasi-PAL signal output of modulator is amplified by the chrominance amplifier 41, which provides outputs for delivery to a burst separator 57 and to 1-H delay line apparatus 43. The delay line 43 provides delay of the supplied signals by an amount substantially corresponding to a line interval duration; however, pursuant to accepted PAL decoder practice, the precise delay provided by the device 43 corresponds to 283 ½ cycles of PAL subcarrier frequency (i.e., being less than 1-H by 57 nanoseconds, a quarter-cycle at the PAL subcarrier frequency), wherefore the quasi-PAL subcarrier effectively undergoes a net phase reversal in traversal of the delay line.

A matrix network 45, coupled to both the input and the output of delay line 43, incorporates, per accepted PAL decoder practice, means for additively combining the delay line input and output, and means for subtractively combining the delay line input and output. The product of the subtractive combination is supplied to a synchronous detector 49 for production of a B−Y color-difference signal output, such output being supplied to the receiver's display control circuitry (not illustrated). The product of the additive combination is supplied to a synchronous detector 47 for production of an R−Y color-difference signal output, also to be supplied to the aforementioned display control circuitry.

During receiver operation in the SECAM-reception mode, delay line 43 serves a memory function, assuring delivery of a B−Y modulated subcarrier component to detector 49, and delivery of an R−Y modulated subcarrier component to detector 47, during all active line interval image portions, despite the line sequential character of such component appearances in the quasi-PAL output of modulator 23.

As explained in more detail in the previously mentioned U.K. Pat. (No. 1,358,551), the subtractive combination of delay line input and output (in matrix 45, here) develops a signal in which the B−Y modulated subcarrier component appears with like phasing in successive line intervals; this component is subject to synchronous detection in detector 49 (for B−Y signal recovery) through delivery to detector 49 of reference oscillations (from reference oscillator 51) of the same frequency and phase as was employed in development of this B−Y modulated subcarrier component by modulator 23. The accompanying R−Y modulated subcarrier component, also appearing with a fixed phase in the subtractive combiner output, is not subject to detection in detector 49, due to its quadrature phase relationship with the demodulating reference oscillations of +(B−Y) phase.

The additive combination of delay line input and output, on the other hand (as further explained in said U.K. patent), develops a signal in which the R−Y modulated subcarrier components appears with a phasing subject to reversal during alternate ones of successive line intervals. This component is subject to synchronous detection in detector 47, for repeated development of +(R−Y) color difference signals, through an alternating delivery to detector 47 of (1) reference oscillations of the same frequency and phase, i.e. +(R−Y) phase, as was employed in development of the R−Y modulated subcarrier component by modulator 23, and (2) reference oscillations of such frequency, but of opposite phase, i.e., of −(R−Y) phase. This delivery is effected from oscillator via 90° phase shifting 53 and polarity switching circuit 55, the latter serving, under control of half line rate control waves developed by flip-flop circuit 61, to pass the output of shifter 53 without phase reversal during alternate line intervals, and to pass the output of shifter 53 with a 180° phase reversal during the intervening line intervals. A phase alternating B−Y modulated subcarrier component, which also appears in the output of the additive combining means of matrix 45, is not subject to synchronous detection in detector 47, because of its quadrature phase relationship with the demodulating reference oscillation of +(R−Y) and −(R−Y) phase.

Control of the phasing of the operation of flip-flop circuit 61 is provided by a PAL identification circuit 63. Illustratively, the PAL identification circuit 63 is of the type described in the copending U.S. Patent Application Ser. No. 836,712 (filed Sept. 26, 1977). In such an arrangement, the output of a synchronous detector, responsive to a burst component of received signals and to PAL reference oscillations, is supplied to a sample-and-hold circuit. Sampling, confined to the burst period of alternate line intervals under the control of an output of the associated flip-flop circuit, develops an output signal with a level providing an indication of the correctness or incorrectness of the phasing of the flip-flop circuit operation. When the output level indicates phasing incorrectness, the flip-flop circuit is rapidly reset to obtain correct phasing. In application of this identification technique to the FIG. 1 apparatus, the synchronous detector function is served by phase detector 59, responsive to outputs of burst separator 57 and phase shifter 53.

The phase alternation of the bursts of the quasi-PAL signal described herein permit satisfactory operation of the described PAL identification system in the same manner as is obtained when the burst phase change in the received signal is of the type associated with the standard PAL system's swinging burst. Other PAL identification systems, such as, for example, the identification system of U.S. Pat. No. 3,553,357—Carnt, may be substituted for the above-described identification system, with proper operation in response to the quasi-PAL bursts also obtained.

As previously mentioned, the coupling of an oscillator phase control signal from the burst phase detector 59 to the PAL reference oscillator 51 is subject to disabling by switch section S3 when receiver operation is in the SECAM-reception mode. Thus, during such operation, when quasi-PAL signal development (by modulator 23) and detection (by detectors 47 and 49) is desired, the PAL reference oscillator 51 is left in a free-running state, for delivery of appropriately related phases of reference oscillations for use in the respective modulation and demodulation activities.

When receiver operation is in the alternative PAL-reception mode, with modulator coupling to amplifier 41 disrupted, and amplifier 41 accepting its input from the PAL chrominance bandpass filter 13, the coupling of an oscillator phase control signal from phase detector 59 to the PAL reference oscillator 51 is enabled, permitting normal phase synchronization of the oscillator with respect to the average phase of the standard PAL swinging burst. The other illustrated elements of the PAL decoder now perform their normal PAL signal processing functions. Additional PAL decoder elements, such as an automatic chrominance control (ACC) circuit and a color killer (neither specifically illustrated in FIG. 1), respond in normal fashion to the swinging burst component of the received PAL signal. Illustratively, where the PAL identification circuit is of the type described in the aforementioned U.S. patent application, control of the ACC and color killer functions may be conveniently associated with suitable responses to the same sampled output from which flip-flop control information is derived. With regard to these ACC and color killer circuits, it will be noted that the presence of the previously described quasi-PAL burst components, during receiver operation in the SECAM-reception mode, permits a desired mode of operation of such additional circuits (i.e., achievement of unkilling of the chrominance amplifier; and control of the chrominance amplifier gain at some desired fixed gain, as determined by appropriate setting of the magnitude of the burst pedestals inserted by circuit 21).

FIG. 3 illustrates schematically a circuit arrangement which may be employed advantageously in implementing the functions of the subcarrier phase switching circuit 33 of the FIG. 1 receiver. In the FIG. 3 circuit, oscillations derived directly from oscillator 51 (FIG. 1), and exhibiting the phase designated $-(B-Y)$ in FIG. 2, are applied to the base electrode of an input transistor 71, disposed in an emitter-coupled differential amplifier configuration with an output transistor 72. Transistor 73 serves as a substantially constant current source coupled to the joined emitter electrodes of transistors 71 and 72. Oscillations of the $+(B-Y)$ phase, developed across a load resistor 74 in the collector circuit of output transistor 72, are applied to the base electrode of a transistor 78 disposed in an emitter-follower configuration.

Oscillations derived from oscillator 51 via the 90° phase shifter 65 (FIG. 1), and exhibiting a $-(R-Y)$ phase (FIG. 2), are applied to the base electrode of an input transistor 81, disposed in an emitter-coupled differential amplifier configuration with an output transistor 82. Transistor 83 serves as a substantially constant current source coupled to the joined emitter electrodes of transistors 81 and 82. Oscillations of the $-(R-Y)$ phase, developed across a load resistor 84 in the collector circuit of output transistor 82, are applied to the base electrode of a transistor 88 disposed in an emitter-follower configuration. Oscillations of an inverted phase, i.e., of the $+(R-Y)$ phase (FIG. 2), appear across a load resistor 85 in the collector circuit of input transistor 81, and are applied to the base electrode of a transistor 89 disposed in an emitter-follower configuration.

The emitter electrodes of emitter-follower transistors 78, 88 and 89 are connected in common to the subcarrier wave input terminals S of the PAL modulator 23 (FIG. 1), and are returned to a point of reference potential by a common emitter resistor 79. Control of selective enabling and disabling of the respective emitter-followers as oscillation sources for the modulator is effected by a quartet of switching transistors 91, 92, 101 and 102.

Switching transistors 91 and 92 are disposed in an emitter-coupled, differential amplifier configuration, with transistor 93 serving as a substantially constant current source coupled to the joined emitter electrodes. The collector electrode of transistor 91 is directly connected to the base electrode of emitter-follower transistor 88, while the collector electrode of transistor 92 is directly coupled to the base electrode of emitter-follower transistor 78.

Switching transistors 101 and 102 are also disposed in an emitter-coupled, differential amplifier configuration, with transistor 103 serving as a substantially constant current source coupled to the joined emitter electrodes. The collector electrode of transistor 101 is directly connected to the base electrode of emitter-follower transistor 78, while the collector electrode of transistor 102 is directly connected to the base of emitter-follower transistor 89.

Control of the conduction of the respective switching transistors to effect delivery of the desired subcarrier phasing sequence at terminal S is achieved in response to a trio of control waves: (1) a half line rate control wave derived from terminal A of flip-flop circuit 29 (FIG. 1) and supplied to the base electrodes of switching transistors 91 and 102; (2) a half line rate control wave derived from terminal B of flip-flop circuit 29 (FIG. 1), opposite in phase to the wave from terminal A, and supplied to the base electrode of transistor 101; and (3) a line rate control wave derived from terminal C of burst gating pulse source 27.

FIG. 4 graphically illustrates the waveforms (c, b, and d, respectively) of these control waves against a common time base shared with an illustrative depiction (waveform "a") of the modulating signal input (with inserted burst pedestals "p") concurrently delivered to the modulating signal input terminal of modulator 23 (FIG. 1). In the illustrative showing of waveform "a", the color-difference signal following the first burst pedestal (at the left of the drawing) represents an $R-Y$ color-difference signal output of FM detector 17 (FIG. 1), the color-difference signal following the second burst pedestal represents a $B-Y$ color-difference signal developed by the FM detector during the succeeding line interval, and the color-difference signal following the third burst pedestal represents an $R-Y$ color-difference signal developed by the FM detector during the next succeeding line interval. Shown above the modulating signal waveform "a" is the subcarrier phasing sequence developed by the FIG. 3 circuit. At the right-hand side of waveforms "b", "c" and "d" are illustrative voltage swings of the respective waveforms for FIG. 3 operation.

During the delivery of the first burst pedestal to the modulating signal input terminal of modulator 23, conduction by switching transistor 92 and switching transistor 101 precludes oscillation delivery via emitter-follower transistors 78 and 88, while cut-off of transistor 102 permits delivery of oscillations of $+(R-Y)$ phase to the subcarrier input terminal S via emitter-follower transistor 89.

During the succeeding delivery of an $R-Y$ color difference signal to the modulating signal input terminal of modulator 23, the continued conduction by transistors 92 and 101, and the continued cut-off of transistor 102, results in a continuation of delivery of oscillations of $+(R-Y)$ phase to terminal S via transistor 89.

During the delivery of the second burst pedestal to the modulating signal input terminal of modulator 23, conduction by switching transistors 91 and 102 precludes oscillation delivery via emitter-follower transistors 78 and 89, while cut-off of transistor 92 permits delivery of oscillations of $-(R-Y)$ phase to terminal S via emitter-follower transistor 88.

During the succeeding delivery of a $B-Y$ color-difference signal to the modulating signal input terminal of modulator 23, conduction by switching transistors 92 and 102 precludes oscillation delivery via emitter-follower transistors 88 and 89, while cut-off of transistors 91 and 101 permit delivery of oscillations of $+(B-Y)$ phase to terminal S via emitter-follower transistor 78. During succeeding line intervals, the above-described subcarrier phasing sequence is repeated.

What is claimed is:

1. Apparatus for converting chrominance information encoded in SECAM fashion to a chrominance signal suitable for application to a PAL decoder, said chrominance information appearing during image portions of successive line intervals, said image portions of said line intervals following blanking portions thereof; said apparatus comprising:

frequency discriminator means, responsive to said chrominance information encoded in SECAM fashion, for sequentially developing, during image portions of successive line intervals, respective first and second color-difference signals;

a source of oscillations of a frequency corresponding to the standard PAL color subcarrier frequency; and means, responsive to the output of said frequency discriminator means and the output of said source of oscillations, for developing an output chrominance signal comprising (a), during alternate line intervals, oscillations of said PAL color subcarrier frequency, having a first phase and modulated in amplitude in accordance with said first color-difference signal, and immediately preceded by substantially constant amplitude bursts of oscillations of said PAL color subcarrier frequency and of said first phase, and (b), during intervening line intervals, oscillations of said PAL color subcarrier frequency, having a second phase differing from said first phase by 90° and modulated in accordance with said second color-difference signal, and immediately preceded by substantially constant amplitude bursts of oscillations of said PAL color subcarrier frequency and of a third phase differing from said first phase by 180°.

2. Apparatus for converting chrominance information encoded in SECAM fashion to a chrominance signal suitable for application to a PAL decoder, said chrominance information appearing during image portions of successive line intervals, said image portions of said line intervals following blanking portions thereof; said apparatus comprising:

frequency discriminator means, responsive to said chrominance information encoded in SECAM fashion, for sequentially developing, during image portions of successive line intervals, respective first and second color-difference signals;

a source of oscillations of a frequency corresponding to the standard PAL color subcarrier frequency; and means, responsive to the output of said frequency discriminator means and the output of said source of oscillations, for developing an output chrominance signal comprising (a), during alternate line intervals, oscillations of said PAL color subcarrier frequency, having a first phase and modulated in amplitude in accordance with said first color-difference signal, and immediately preceded by substantially constant amplitude bursts of oscillations of said PAL color subcarrier frequency and of said first phase, and (b), during intervening line intervals, oscillations of said PAL color subcarrier frequency, having a second phase differing from said first phase by 90° and modulated in amplitude in accordance with said second color-difference signal, and immediately preceded by substantially constant amplitude bursts of oscillations of said PAL color subcarrier frequency and of a third phase differing from said first phase by 180°;

wherein said output chrominance signal developing means includes:

means, having a subcarrier input terminal and a modulating signal input terminal, for amplitude modulating oscillations delivered to said subcarrier input terminal in accordance with signals delivered to said modulating signal input terminal;

means for augmenting the color-difference signal output of said frequency discriminator means with burst gating pulses respectively occupying a given segment of each blanking portion of said successive line intervals;

means for applying the augmented color-difference signal output to said modulating signal input terminal; and means, responsive to oscillations from said source, for delivering to said subcarrier input terminal:

(1) oscillations of said PAL color subcarrier frequency and of said first phase, during the image portion of those line intervals when said first color difference signal is developed by said frequency discriminator means;

(2) oscillations of said PAL color subcarrier frequency and of said second phase, during the image portion of those line intervals when said second color difference signal is developed by said frequency discriminator means;

(3) oscillations of said PAL color subcarrier frequency and of said third phase, during each of said blanking portion segments which immediately precede development of said second color difference signal by said frequency discriminator means; and (4) oscillations of said PAL color subcarrier frequency and of said first phase, during each of said blanking portion segments which immediately precede development of said first color difference signal by said frequency discriminator means.

3. Apparatus in accordance with claim 2 wherein said oscillation delivering means includes:

an amplifier, having an output terminal and responsive to oscillations from said source, for developing oscillations of said PAL subcarrier frequency and of said second phase at said amplifier output terminal;

means for imparting a 90° phase shift to oscillations provided by said source;

phase splitting means, having first and second output terminals and responsive to oscillations from said source, for developing oscillations of said PAL color subcarrier frequency and of said first phase at said first phase splitting means output terminal, and oscillations of said PAL color subcarrier frequency and of said third phase at said second phase splitting means output terminal;

a trio of semiconductor devices, each having an input electrode and an output electrode;

means for coupling each of said semiconductor device input electrodes to a respectively different one of said output terminals;

a first switching means coupled to said first phase splitting means output terminal for disabling the semiconductor device coupled to said first phase splitting means output terminal only during those line intervals associated with development of said first color difference signal by said frequency discriminator means;

second switching means coupled to said second phase splitting means output terminal for enabling the semiconductor device coupled to said second phase splitting means of the terminal only during each of said blanking portion segments which immediately precede development of said second color difference signal by said frequency discriminator means;

third switching means coupled to said amplifier output terminal for enabling the semiconductor device coupled to said amplifier output terminal only during the image portion of those line intervals when said second color difference signal is developed by said frequency discriminator means;

an oscillation delivering means output terminal; and means for coupling the output electrodes of said semiconductor devices in common to said oscillation delivering means output terminal.

4. Apparatus in accordance with claim 3 also including a flip-flop circuit for developing first and second output waves of half line frequency, said first and second output waves being of mutually opposite phase;

a source of line frequency pulses occurring in substantial time coincidence with said blanking portion segments of said successive line intervals;

a first transistor having base, emitter and collector electrodes, said collector electrode being coupled to said amplifier output terminal, and said base electrode being coupled to receive said first output wave developed by said flip-flop circuit;

a second transistor having base, emitter and collector electrodes, said collector electrode being coupled to said second output terminal of said phase splitting means, and said base electrode being coupled to said source of pulses;

a first source of substantially constant current;

means for coupling said emitter electrodes of said first and second transistors to said first source of substantially constant current;

a third transistor having base, emitter and collector electrodes, said collector electrode being coupled to said amplifier output terminal, and said base electrode being coupled to receive said second output wave developed by said flip-flop circuit;

a fourth transistor having a base, emitter and collector electrodes, said collector electrode being coupled to said first output terminal of said phase splitting means, and said base electrode being coupled to receive said first output wave developed by said flip-flop circuit;

a second source of substantially constant current;

means for coupling the emitter electrodes of said third and fourth transistors to said second source of substantially constant current;

wherein said first switching means comprises said fourth transistor, wherein said second switching means comprises said second transistor and wherein said third switching means comprises said first and third transistors.

5. A color television receiver subject to alternative operation in a SECAM-encoded signal reception mode and a PAL-encoded signal reception mode; said receiver including apparatus for converting chrominance information encoded in SECAM fashion to a chrominance signal suitable for application to a PAL decoder, said chrominance information appearing during image portions of successive line intervals, said image portions of said line intervals following blanking portions thereof;

wherein said converting apparatus comprises:

frequency discriminator means, responsive to said chrominance information encoded in SECAM fashion, for sequentially developing, during image portions of successive line intervals, respective first and second color-difference signals;

a source of oscillations of a frequency corresponding to the standard PAL color subcarrier frequency; and means, responsive to the output of said frequency discriminator means and the output of said source of oscillations, for developing an output chrominance signal comprising (a), during alternate line intervals, oscillations of said PAL color subcarrier frequency, having a first phase and modulated in amplitude in accordance with said first color-difference signal, and immediately preceded by substantially constant amplitude bursts of oscillations of said PAL color subcarrier frequency and of said first phase, and (b), during intervening line intervals, oscillations of said PAL color subcarrier frequency, having a second phase differing from said first phase by 90° and modulated in amplitude in accordance with said second color-difference signal, and immediately preceded by substantially constant amplitude bursts of oscillations of said PAL color subcarrier frequency and of a third phase differing from said first phase by 180°;

said receiver also including:

a 1-H delay line having an input and an output;

a first synchronous detector responsive to the additive combination of signals derived from the input and output of said delay line;

a second synchronous detector responsive to the subtractive combination of signals derived from the input and output of said delay line;

means coupled to said source of oscillations for applying oscillations of said second phase to said second synchronous detector;

means responsive to oscillations from said source for supplying oscillations of said first phase to said first synchronous detector during alternate line intervals and for supplying oscillations of said third phase to said first synchronous detector during the intervening line intervals;

burst separator means for passing signals only during said blanking portion segments of said successive line intervals;

a phase detector responsive to the output of said first separating means for developing a phase control signal for said source of oscillations;

means for coupling said phase control signal to said source of oscillations;

a first signal path, independent of said frequency discriminating means and said output chrominance signal developing means, and selectively enabled during receiver operation in said PAL-encoded signal reception mode, for supplying received signals to the inputs of said delay line and said burst separator means;

a second signal path, enabled only during receiver operation in said SECAM-encoded signal reception mode, for supplying said output chrominance signal to the inputs of said delay line and said burst separator means; and means for disabling said phase control signal coupling means during receiver operation in said SECAM-encoded signal reception mode, and for enabling said phase control signal coupling means during receiver operation in said PAL-encoded signal reception mode.

6. Apparatus in accordance with claim 5 wherein said receiver also includes means, responsive to an output of said phase detector, for controlling the operation of said oscillation supplying means.

* * * * *

UNITED STATES PATENT AND TRADEMARK OFFICE
CERTIFICATE OF CORRECTION

PATENT NO. : 4,233,622

DATED : November 11, 1980

INVENTOR(S): Willem H. Groeneweg

It is certified that error appears in the above-identified patent and that said Letters Patent is hereby corrected as shown below:

Column 5, line 58, that portion reading "oscillator via" should read -- oscillator 51 via --; Column 7, line 12, that portion reading "-(B-Y)" should read -- +(B-Y) --.

Signed and Sealed this

Third Day of March 1981

[SEAL]

*Attest:*

RENE D. TEGTMEYER

*Attesting Officer*     *Acting Commissioner of Patents and Trademarks*